UNITED STATES PATENT OFFICE.

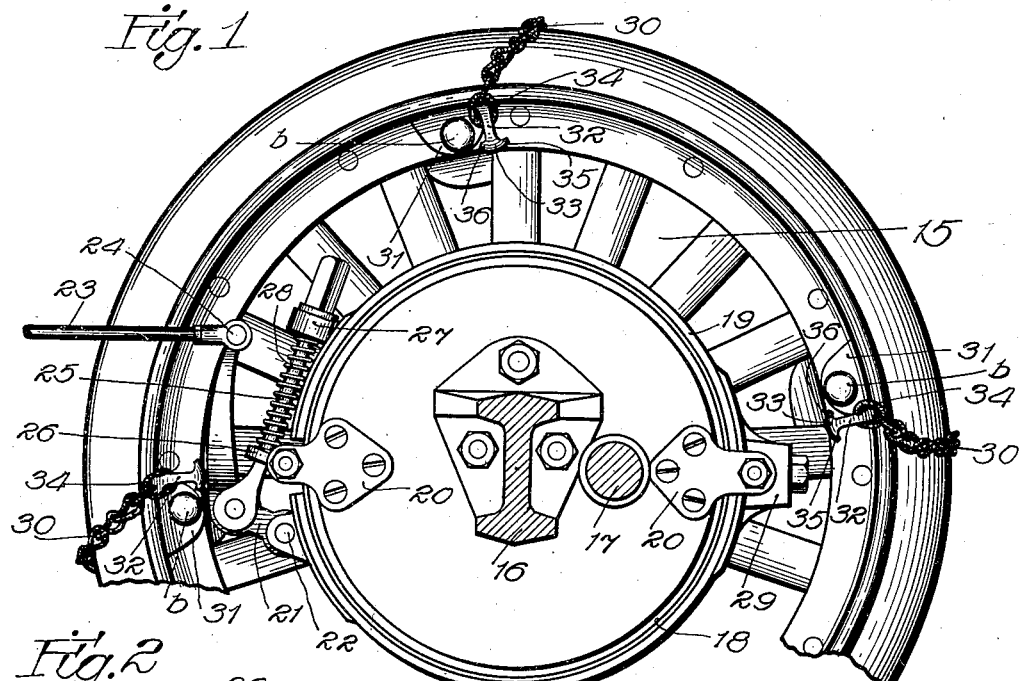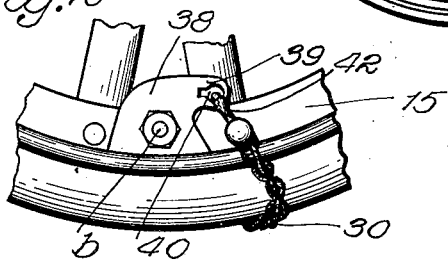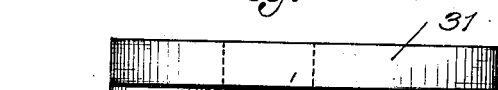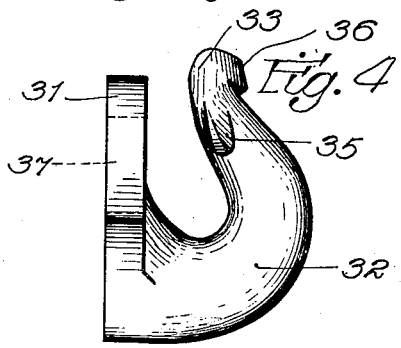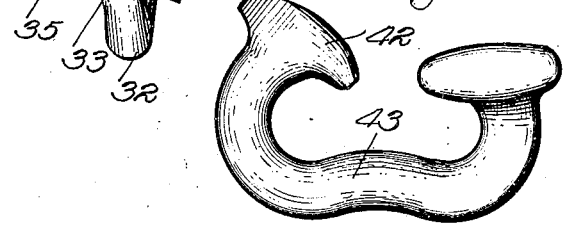

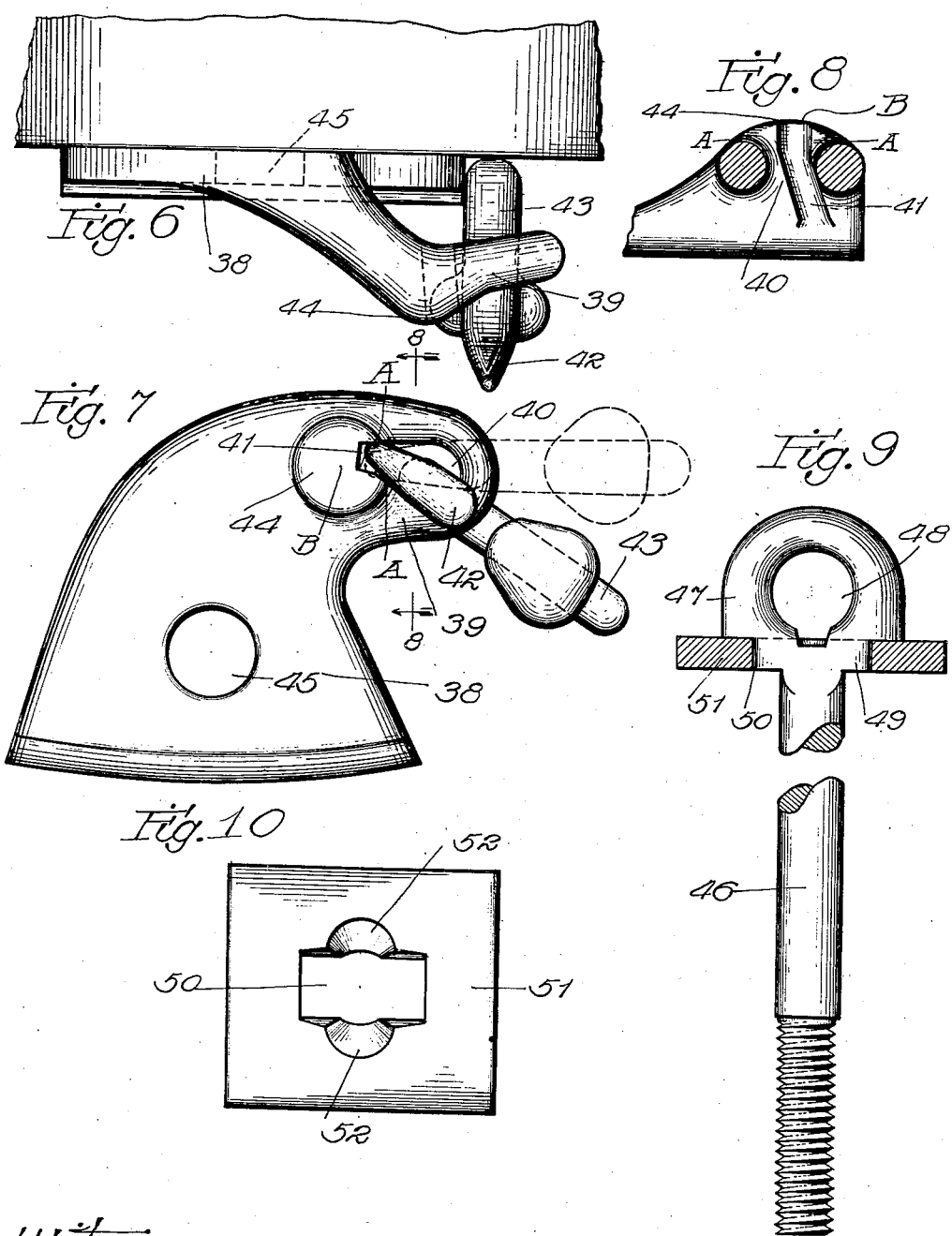

WILLIAM H. KRUG, OF OSHKOSH, WISCONSIN.

ANTISKID DEVICE.

1,305,377.  Specification of Letters Patent.  Patented June 3, 1919.

Application filed May 20, 1918. Serial No. 235,435.

*To all whom it may concern:*

Be it known that I, WILLIAM H. KRUG, a citizen of the United States, residing at Oshkosh, in the county of Winnebago and State of Wisconsin, have invented a certain new and useful Improvement in Antiskid Devices, of which the following is a full, clear, concise, and exact description, reference being had to the accompanying drawings, forming a part of this specification.

This invention relates to anti-skid devices and is particularly concerned with the provisions of means for securing anti-skid chains to wheels, in which the construction of the brake operating mechanism is such that it prevents the use of spoke engaging clamps such as those disclosed in my copending application Serial No. 225,413, filed March 29, 1918. In some motor driven vehicles portions of the brake operating mechanism lie so close to the spokes and extend so close to the felly that it is impossible to use clamps similar to those shown in my copending application above referred to.

The objects of this invention are:

First: To provide means for securing anti-skid chains to vehicle wheels of such a character that they may be clamped to the fellies of the wheels in a position where they will not strike against nor interfere with the operation of the brake operating mechanism;

Second: To provide means of the character described which will permit the anti-skid chains to be secured to the wheel with a minimum amount of slack, whereby the likelihood of the chains becoming detached from the wheel is diminished;

Third: To provide means for throwing the head of the coupling member, which I employ for securing one end of the anti-skid chain, away from the slot in the member with which it co-acts whenever the head moves to a position parallel with this slot in order to prevent the head from passing through the slot and thus disengaging the coupling member from the slot bearing member;

Fourth: To provide novel means for securing one end of an anti-skid chain to the inner side of the felly of a wheel; and Fifth: To provide novel means for securing the two ends of an anti-skid chain to the felly of a wheel, comprising a bolt extending through said felly from one side to the other.

Other objects will appear as the description progresses, reference being had to the accompanying drawings, in which—

Figure 1 is a side elevation of one side of a vehicle wheel showing the brake operating mechanism, and my improved means for attaching the ends of the anti-skid chains to the side of the wheel nearer the body of the vehicle, the supporting and driving axles being shown in section and a portion of the wheel being broken away;

Fig. 2 is a side elevation of the outer side of a vehicle wheel opposite from that shown in Fig. 1 showing my improved means for securing one end of an anti-skid chain to the wheel; parts of the wheel being broken away;

Fig. 3 is a plan view of my improved means for securing the one end of an anti-skid chain to the felly of the wheel;

Fig. 4 is an end elevation thereof;

Fig. 5 is a side elevation of my improved coupling member which I employ in connection with the means for securing one end of the anti-skid chain to the wheel, and which is specifically described and claimed in my co-pending application above referred to;

Fig. 6 discloses a portion of the felly of a wheel having my improved means for securing one end of an anti-skid chain thereto, the latter means being shown in plan, and also showing the coupling member illustrated in Fig. 5 in co-acting relation with the last-named means;

Fig. 7 is a side elevation of the means shown in Fig. 6 for securing the one end of an anti-skid chain to a wheel;

Fig. 8 is a section taken on the line 8—8 of Fig. 7;

Fig. 9 discloses a modified means for securing the one end of an anti-skid chain to the wheel; and Fig. 10 is a plan view of the plate shown in section in Fig. 9.

Like characters of reference refer to like parts throughout the several views.

Referring to the drawings the reference character 15 indicates as a whole a wheel which is rotatably mounted upon the supporting axle 16 and driven by the driving axle 17. The reference character 18 indicates the brake drum which is surrounded by the brake strap 19. A bell-crank lever 21 has one end pivotally secured to one end of the brake strap 19, as shown at 22, and the other end pivotally secured to a link 23, as shown at 24. The link 23 is operated by suitable mechanism (not shown) to set and release the brake. A rod 25 is pivotally secured to the bell-crank lever 21 at the angle of said lever, and slides in a bearing 26 secured to the adjacent bracket 20. The upper end of the rod 25 is secured to a lug 27 on the opposite end of the brake strap from that to which the lever 21 is pivoted. A spring 28 interposed between the lug 27 and the bearing 26 provides means for releasing the brake when the link 23 is moved rearwardly.

The construction thus far described is well known and forms no part of my present invention, but is illustrated merely to disclose the type of wheel with which my present invention is intended to be utilized. It will be noted that the bell-crank lever 21 and the lug 29 secured to the right hand bracket 20 both project in near proximity to the spokes and felly of the wheel. As stated above it is impossible to use clamps of the type disclosed in my application above referred to with wheels of this type, for the reason that these clamps will strike against the portions of the brake mechanism referred to, when the wheel rotates.

My improved means for connecting one end of an anti-skid chain 30 to a vehicle wheel comprises a plate 31 which, as shown in Fig. 1, has a curved inner edge. This plate is provided with a laterally extending hook 32, the end of which is provided with a cross head 33 which extends adjacent to the curved edge of the plate 31 and in a plane parallel therewith, the space between the cross head and the plate being just sufficient to permit one side of the straight link 34 at the end of the anti-skid chain nearer the body of the vehicle to pass therebetween. The end 35 of this cross head is somewhat longer than the end 36, so that in securing the link 34 to this hook the link is first placed over the end 35 and then moved toward the hook until the other end of the link will clear the end 36. The link then drops down into the bight of the hook 32.

From the above description it will be apparent that in order to remove the link 34 from the hook it is necessary to perform several different steps which must be performed in a certain order and that it is therefore very unlikely that the link 34 will ever become accidentally detached from the hook 32. The plate 31 is provided with an opening 37 for receiving the bolt $b$ for attaching the plate and hook to the wheel.

My improved means for connecting the other end of an anti-skid chain to the wheel comprises a plate 38 having an edgewise and laterally offset portion 39, which is provided with a keyhole opening 40. The slot 41 of this keyhole opening is inclined inwardly toward the center of the wheel and opens into the face of the offset portion on the side of said plate opposite to the felly at substantially the inner side of the keyhole opening, as shown in Fig. 7. In other words, one side of the slot is substantially tangent with the round portion of the opening. By this arrangement the head 42 of the coupling member 43 can be passed through the keyhole slot at substantially the angle shown in Fig 7. With this arrangement of the slot relative to the other portion of the keyhole opening, it is possible to connect the coupling member with the plate 38 without making it necessary to provide as much slack in the chain as it would if the slot of the keyhole opening opened thereinto symmetrically with respect to a horizontal line drawn through the center of the opening in Fig. 7. With such a formation of the slot it would be necessary to raise the coupling member to the position indicated in dotted lines, which would mean that more slack would have to be provided in the chain in order to permit the coupling member to be raised to this position.

During the operation of a wheel equipped with an anti-skid chain secured thereto by the means just described, the coupling member 43 oscillates in the keyhole opening and at one position the head 42 thereof is substantially parallel with the length of the keyhole slot and by a sudden lateral jolt of the wheel might be caused to pass through the slot and thus detach the coupling member from the plate 38. While experience has demonstrated that it is very improbable that the coupling member will ever become thus accidentally displaced, I have discovered an additional means for insuring against such an occurrence. This means comprises a cam surface 44, which gradually increases in height from the points A to the point B, and which is adapted to throw the head 42 of the coupling member away from the slot whenever either end of the head of the coupling member strikes these inclined portions as it oscillates from one position to another. This oscillating movement of the coupling member is comparatively rapid and the inclination of the cam surface 44 is sufficient to throw the head of the coupling member away from the slot. The plate 38 is provided with an opening 45 which receives one end of the bolt $b$. The bolt $b$ therefore secures both the plate 31 and the plate 38 to opposite sides of the felly of the wheel.

In Fig. 9 I have disclosed a bolt 46 having a head 47 provided with a keyhole opening 48 and an elongated shoulder 49 which is received in the elongated opening 50 of the plate 51. In using this bolt I omit the plate 38 and merely use the plate 31 and its attached hook in connection with this bolt. The coupling member 43 co-acts with the keyhole opening 48 to secure one end of the chain to the wheel, while the plate 31 and its hook secures the other thereof to the wheel in the manner described above. As shown in Fig. 10 the elongated sides of the opening 50 are cut away at 52 in order to facilitate the connection of the coupling member with the apertured head of the bolt 46.

While I have described the details of the preferred embodiment of my invention, it is to be understood that this invention is capable of other adaptations and modifications within the scope of the appended claims.

Having thus described my invention, what I claim as new and desire to secure by Letters Patent of the United States is:

1. The combination with an anti-skid chain of means for securing one end of said chain to a wheel, comprising a plate having a laterally offset portion provided with a keyhole opening, the slot of said opening being inclined from one face to the other face of the said offset portion, a coupling member co-acting with said keyhole slot to secure the end of said chain to said offset portion, the said coupling member being provided with a head, and a cam surface on said offset portion for throwing said head away from said opening when the coupling member rotates in said opening.

2. The combination with an anti-skid chain of means for securing one end of said chain to a wheel, comprising a plate having a laterally offset portion provided with a keyhole opening, the slot of said opening being inclined from one face to the other of said offset portion, and a coupling member co-acting with said keyhole slot to secure the end of said chain to said offset portion.

3. The combination with an anti-skid chain of means for securing one end of said chain to a wheel, comprising a plate adapted to be secured to one side of a felly, and comprising a hook extending laterally therefrom, the free end of said hook being provided with a cross head spaced from the adjacent edge of the plate and extending substantially parallel with the plane of the plate.

4. The combination with an anti-skid chain of means for securing one end of said chain to a wheel, comprising a plate having a keyhole opening, the slot of said opening being inclined from one face to the other face of said plate, and a coupling member co-acting with said keyhole slot to secure the end of said chain to said plate.

5. The combination with an anti-skid chain of means for securing one end of said chain to a wheel, comprising a plate having a laterally offset portion provided with an opening, and a coupling member co-acting with said opening to secure the end of said chain to said offset portion.

6. The combination with an anti-skid chain, of means for securing one end of said chain to a wheel, comprising a plate adapted to be secured to the side of a felly, and having a hook extending laterally therefrom, means for securing the other end of the chain to the opposite side of the felly, comprising a plate provided with a keyhole opening, the slot of said opening being inclined from one face to the other face of said plate, a coupling member secured to the last named end of the chain, and provided with a head co-acting with the keyhole opening, and a bolt for securing said plate to the sides of the felly.

7. Means for securing one end of an anti-skid chain to a wheel, comprising a plate adapted to be secured to one side of the felly and having an offset portion provided with a keyhole opening, the slot of said opening being inclined inwardly from one face to the other face of said plate, and a cam surface formed on said plate adjacent said slot.

8. Means for securing one end of an anti-skid chain to a wheel, comprising a plate having an offset portion provided with a keyhole opening, the slot of said opening being inclined inwardly from one face to the other of said plate.

9. Means for securing one end of an anti-skid chain to a wheel, comprising a plate having a laterally offset portion provided with a key-hole opening, and means for securing said plate to a felly with the slot extending substantially parallel with the felly.

10. Means for securing one end of an anti-skid chain to a wheel, comprising a member provided with a keyhole opening, one side of the slot of said opening being substantially tangent with the round portion of said opening.

11. The combination with a wheel felly, of means for securing one end of a chain to said felly, comprising a member having a portion spaced from said felly, and provided with a keyhole opening, the slot of said opening being arranged unsymmetrically relative to the enlarged portion of said opening.

In witness whereof, I hereunto subscribe my name this 13 day of May, 1918.

WM. H. KRUG.

Witnesses:
H. W. JOHNSON,
E. H. BECKER.